United States Patent
Moore et al.

(10) Patent No.: US 8,209,476 B2
(45) Date of Patent: Jun. 26, 2012

(54) METHOD AND APPARATUS FOR USING A ONE-TIME OR FEW-TIME PROGRAMMABLE MEMORY WITH A HOST DEVICE DESIGNED FOR ERASABLE-REWRITEABLE MEMORY

(75) Inventors: Christopher S. Moore, San Jose, CA (US); Adrian Jeday, San Francisco, CA (US); Matt Fruin, San Jose, CA (US); Chia Yang, San Jose, CA (US); Derek Bosch, Mountain View, CA (US)

(73) Assignee: SanDisk 3D LLC, Milpitas, CA (US)

( * ) Notice: Subject to any disclaimer, the term of this patent is extended or adjusted under 35 U.S.C. 154(b) by 0 days.

(21) Appl. No.: 12/917,293

(22) Filed: Nov. 1, 2010

(65) Prior Publication Data
US 2011/0047416 A1 Feb. 24, 2011

Related U.S. Application Data

(60) Continuation of application No. 11/796,828, filed on Apr. 27, 2007, now Pat. No. 7,861,058, which is a division of application No. 10/956,463, filed on Sep. 30, 2004, now Pat. No. 7,398,348.

(60) Provisional application No. 60/604,353, filed on Aug. 24, 2004.

(51) Int. Cl.
*G06F 12/00* (2006.01)
*G06F 13/00* (2006.01)

(52) U.S. Cl. ......... 711/103; 711/100; 711/154; 711/200

(58) Field of Classification Search .................. 711/100, 711/103, 118, 154, 200, 202, 206
See application file for complete search history.

(56) References Cited

U.S. PATENT DOCUMENTS

| 4,646,266 A | 2/1987 | Ovshinsky et al. |
| 4,682,318 A | 7/1987 | Busby |
| 4,691,299 A | 9/1987 | Rivest et al. |
| 4,740,890 A | 4/1988 | William |

(Continued)

FOREIGN PATENT DOCUMENTS

DE 197 00 510 12/1997

(Continued)

OTHER PUBLICATIONS

Chinese Office Action for Serial No. 2005/80027871.1, dated Aug. 19, 2010, 2 pages.

(Continued)

*Primary Examiner* — Tuan V. Thai (74) *Attorney, Agent, or Firm* — Brinks Hofer Gilson & Lione (57) ABSTRACT

The embodiments described herein can be used to enable one-time or few-time programmable memories to work with existing consumer electronic devices (such as those that work with flash—an erasable, non-volatile memory) without requiring a firmware upgrade, thereby providing backwards compatibility while minimizing user impact. As such, these embodiments are a viable way to bridge one-time or few-time programmable memories with existing consumer electronic devices that have flash card slots. These embodiments also allow future consumer electronic devices to be designed without updating firmware to include a file system customized for a one-time or few-time programmable memory.

5 Claims, 7 Drawing Sheets

U.S. PATENT DOCUMENTS

| | | |
|---|---|---|
| 4,953,122 A | 8/1990 | Williams |
| 5,029,125 A | 7/1991 | Sciupac |
| 5,040,110 A | 8/1991 | Miki et al. |
| 5,119,291 A | 6/1992 | Flannagan et al. |
| 5,218,685 A | 6/1993 | Jones |
| 5,247,494 A | 9/1993 | Ohno et al. |
| 5,261,072 A | 11/1993 | Siegel |
| 5,265,230 A | 11/1993 | Saldanha et al. |
| 5,307,497 A | 4/1994 | Feigenbaum et al. |
| 5,321,824 A | 6/1994 | Burke et al. |
| 5,437,012 A | 7/1995 | Mahajan |
| 5,437,028 A | 7/1995 | Iijima |
| 5,448,728 A | 9/1995 | Takano et al. |
| 5,457,796 A | 10/1995 | Thompson |
| 5,463,772 A | 10/1995 | Thompson et al. |
| 5,475,820 A | 12/1995 | Natrasevschi et al. |
| 5,530,673 A | 6/1996 | Tobita et al. |
| 5,537,652 A | 7/1996 | Friedl et al. |
| 5,559,778 A | 9/1996 | Inokuchi et al. |
| 5,590,320 A | 12/1996 | Maxey |
| 5,630,093 A | 5/1997 | Holzhammer et al. |
| 5,752,005 A | 5/1998 | Jones |
| 5,761,700 A | 6/1998 | Cozart et al. |
| 5,761,741 A | 6/1998 | Robbins et al. |
| 5,832,263 A | 11/1998 | Hansen et al. |
| 5,835,396 A | 11/1998 | Zhang |
| 5,890,169 A | 3/1999 | Wong et al. |
| 6,000,023 A | 12/1999 | Jeon |
| 6,034,882 A | 3/2000 | Johnson et al. |
| 6,055,180 A | 4/2000 | Gudesen et al. |
| 6,073,208 A | 6/2000 | Norman |
| 6,092,154 A | 7/2000 | Curtis et al. |
| 6,104,635 A | 8/2000 | Ogane |
| 6,108,236 A | 8/2000 | Barnett |
| 6,138,203 A | 10/2000 | Inokuchi et al. |
| 6,185,122 B1 | 2/2001 | Johnson et al. |
| 6,236,587 B1 | 5/2001 | Gudesen et al. |
| 6,282,624 B1 | 8/2001 | Kimura et al. |
| 6,341,085 B1 | 1/2002 | Yamagami et al. |
| 6,345,333 B1 | 2/2002 | Sassa et al. |
| 6,351,838 B1 | 2/2002 | Amelia |
| 6,370,642 B1 | 4/2002 | Chiang et al. |
| 6,377,526 B1 | 4/2002 | Vining et al. |
| 6,404,676 B2 | 6/2002 | Kihara et al. |
| 6,424,581 B1 | 7/2002 | Bosch et al. |
| 6,490,703 B1 | 12/2002 | de la Iglesia et al. |
| 6,515,888 B2 | 2/2003 | Johnson et al. |
| 6,539,396 B1 | 3/2003 | Bowman-Amuah |
| 6,545,891 B1 | 4/2003 | Tringali et al. |
| 6,563,745 B1 | 5/2003 | Ilkbahar |
| 6,584,541 B2 | 6/2003 | Friedman et al. |
| 6,598,135 B1 | 7/2003 | MacLeod |
| 6,615,253 B1 | 9/2003 | Bowman-Amuah |
| 6,631,107 B1 | 10/2003 | Ito et al. |
| 6,647,471 B2 | 11/2003 | March et al. |
| 6,658,438 B1 | 12/2003 | Moore et al. |
| 6,667,939 B1 | 12/2003 | Miyamoto |
| 6,675,276 B2 | 1/2004 | Schulze et al. |
| 6,772,274 B1 | 8/2004 | Estakhri |
| 6,836,834 B2 * | 12/2004 | Schulze et al. ............ 711/200 |
| 6,888,785 B2 | 5/2005 | Morrison |
| 6,904,492 B2 | 6/2005 | Hogan |
| 6,950,918 B1 * | 9/2005 | Estakhri ............ 711/168 |
| 7,027,384 B2 | 4/2006 | Ohbi et al. |
| 7,451,265 B2 * | 11/2008 | Traister et al. ............ 711/103 |
| 2002/0034105 A1 | 3/2002 | Kulkarni et al. |
| 2002/0065983 A1 | 5/2002 | Friedman et al. |
| 2002/0107862 A1 | 8/2002 | Moore et al. |
| 2002/0108054 A1 | 8/2002 | Moore et al. |
| 2003/0016821 A1* | 1/2003 | Hammersmith ............ 380/37 |
| 2003/0041210 A1 | 2/2003 | Keays |
| 2003/0115404 A1 | 6/2003 | Hogan |
| 2003/0120858 A1 | 6/2003 | Moore et al. |
| 2004/0080988 A1 | 4/2004 | Harari et al. |
| 2004/0088474 A1 | 5/2004 | Lin |
| 2004/0098428 A1 | 5/2004 | Schulze et al. |
| 2004/0123064 A1 | 6/2004 | Moore et al. |
| 2004/0153902 A1 | 8/2004 | Machado et al. |
| 2005/0132263 A1 | 6/2005 | Anderson et al. |
| 2005/0281095 A1 | 12/2005 | Eilert et al. |
| 2008/0034174 A1* | 2/2008 | Traister et al. ............ 711/159 |
| 2008/0082774 A1* | 4/2008 | Tomlin et al. ............ 711/170 |

FOREIGN PATENT DOCUMENTS

| | | |
|---|---|---|
| EP | 1 168 150 A1 | 2/2002 |
| EP | 1 331 548 A2 | 7/2003 |
| EP | 1 359 500 | 11/2003 |
| EP | 1 359 500 A2 | 11/2003 |
| JP | 410283717 A | 10/1998 |
| JP | 07-045085 | 2/1999 |
| WO | WO 98/07099 | 2/1998 |
| WO | WO 99/14763 | 8/1998 |
| WO | WO 98/44420 | 10/1998 |
| WO | WO 02/15010 | 2/2002 |
| WO | WO 03/071419 | 8/2003 |

OTHER PUBLICATIONS

Notice of Allowance for U.S. Appl. No. 11/796,882, dated Dec. 14, 2009, 12 pages.

European Search Report for EP Application No. 09006070.8-1229/2088509, dated Aug. 13, 2009, 6 pages.

European Search Report for EP Application No. 09006071.6-1229/2088510, dated Jul. 23, 2009, 6 pages.

Supplemental European Search Report and Search Opinion for EP Application No. 05773526.8, dated Mar. 25, 2009, 12 pages.

International Search Report and Written Opinion for PCT/US05/26054, dated Jul. 7, 2008, 11 pages.

Danny Dolver et al.; Correcting faults in write-once memory; Annual ACM Symposium on Theory of Computing archive Proceedings of the sixteenth annual ACM symposium on Theory of computing; pp. 225-229; 1984;ISBN:0-89791-133-4.

Ronald L. Rivest, Adi Shamir, How to reuse a "write-once" memory (Preliminary Version); May 1982; Proceedings of the fourteenth annual ACM symposium on Theory of computing; pp. 105 113; ISBN:0-89791-070-2.

Zemor, G. and Cohen, G.D.; Error-correcting WOM-codes; Information Theory, IEEE Transactions on; May 1991; vol. 37, Issue: 3, Part 2; pp. 730-734; ISSN: 0018-9448.

"Method for Making a Write-Once Memory Device Read Compatible with a Write-Many File System," U.S. Appl. No. 10/023,468, filed Dec. 14, 2001, Inventors: Moore et al.

Press Release. "DataPlay, Inc.—What's Playing on DataPlay . . . Everything Digital!," 2 Pages, Jan. 7, 2002.

"New Direct CD 2.5 Improves Speed and Reliability of Data Archiving Using CD-R/CD-RW," http://www.adaptec.com/worl...pany/pressrelease.html?prodkey=08051998, 2 pages, Aug. 5, 1998.

"Universal Disk Format (UDF) Driver," http://www.trylinux.com/projects/udf/index.html, 3 pages (1999).

"FAT File Allocation Table," http//www.eaydesksoftware.com/fat.htm, 2 pages, Oct. 24, 1999.

"FAT File Allocation Table," http://www.oreilly.com/reference/directory/terms/F/File_Allocation_Table.htm, 4 pages (1996).

"ISO9960 Simplied for DOS/Windows by Philip J. Erdelsky," http://www.alumni.caltech.edu/~pje/iso9660.html, 8 pages Aug. 26, 2000.

"Memory cards: designing with a full deck," http://www.ednmag.com/ednmag/reg/2000/052520000/11dfl.htm, 12 pages, May 25, 2000.

"DOS Disk Formats," http://www.qvctc.commnet.edu/classes/csc277/formats.html, 7 pages (1999).

"MS-DOS Partitioning Summary," http://www.qvctc.commnet.edu/classes/csc277/fdisk2.html, 3 pages (1999).

"DOS Partitions," http://www.qvctc.commnet.edu/classes/csc277/partitions.html, 5 pages (1999).

"DOS Disk Structures-Definitions," http://www.qvctc.commnet.edu/classes/csc277/formats2.html, 3 pages (1999).

"MS-DOS Summary a Survival Guide," http://www.washtenaw.cc.mi.us/dept/cis/mod/q02cd.html, 10 pages (1996).

"Hardware White Paper, FAT: General Overview of On-Disk Format," Microsoft Corp., 25 pages, May 5, 1999.

"Three-Dimensional Memory Array and Method of Fabrication," U.S. Appl. No. 09/560,626, filed Apr. 28, 2000; Inventor: Johan Knall.

"The MS-Dos Filesystem," http://www.cs.adfa.oz.au/teaching/studinfo/osrts/Lectures/node113.htm, 2 pages Mar. 1, 2001.

"comp.os.ms-windows.programmer.vxdFrequently asked Questions (FAQ)," http://www.faqs.org/faqs/windows/programming/vxd/, 16 pages (1995).

"CD-ROM Driver Installation Procedure," http://www.pcguide.com/proc/setup/cddriver-c.html, 3 pages, Apr. 17, 2001.

"Fujifilm News & Events, Medical Imaging Science Systems NDT Systems," http://www.fujimed.com/news/news_openarch.html, 2 pages, Nov. 26, 2000.

"CNN.com DVD Encryption hacked," http://www.cnn.com/TECH/computing/9911/05/dvd.hack.idg/, 3 pages, Nov. 5, 1999.

"Octopus Systems, Acorn's Solution for the Java™ Technology Platform," http://www.octosys.co.uk/java.html, 9 pages (2001).

"Content Protection System Architecture, A Comprehensive Framework for Content Protection Intel Corp.," 19 pages, Feb. 17, 2000.

"Media security thwarts temptation, permits prosecution," http://www.ednmag.com/ednmag/reg/2000/06222000/13tt.htm, 13 pages, Jun. 22, 2000.

"Memory Device and Method for Storing and Reading Data in a Write-Once Memory Array," U.S. Appl. No. 09/877,720, filed Jun. 8, 2001; Inventors: Christopher S. Moore, James E. Schneider, J. James Tringali, and Roger W. March.

"Memory Device and Method for Storing and Reading a File System Structure in a Write-Once Memory Array," U.S. Appl. No. 09/877,719, filed Jun. 8, 2001; Inventors: Christopher S. Moore, James E. Schneider, J. James Tringali, and Roger W. March.

"Method for Reading Data in a Write-Once Memory Device Using a Write-Many File System," U.S. Appl. No. 09/878,138, filed Jun. 8, 2001; Christopher S. Moore, J. James Tringali, Roger W. March, James E. Schneider, Derek J. Bosch, and Daniel C. Steere.

"Method for Redirecting Data Traffic in a Write-Once Memory Device," U.S. Appl. No. 09/877,691, filed Jun. 8, 2001; J. James Tringali, Christopher S. Moore, Roger W. March, James E. Schneider, Derek J. Bosch, and Daniel C. Steere.

"Chapter 32—Disk Concepts and Troubleshooting," Microsoft Windows 2000 Professional Resource Kit, Microsoft Corporation, 29 pages, Mar. 15, 2000.

"Exotic Memories, Diverse Approaches," EDN Asia, pp. 22-33 (Sep. 2001).

"A Vertical Leap for Microchips," Thomas H. Lee, Scientific American, 8 pages. (Jan. 2002; printed Dec. 10, 2001).

"SmartMedia Physical Format Specifications Version 1.30," SSFDC Forum technical Committee, 23 pages (May 19, 2000).

"SmartMedia Electrical Specifications Version 1.30," SSFDC Forum Technical Committee, 23 pages (May 19, 2000).

NN8803151, IBM Technical Disclosure Bulletin, "Incremental Directory Indexes for Write-Once Media", Mar. 1988, vol. 30, Issue 10, pp. 151-155.

"How Does TrueFFS Manage Wear Leveling," http://www.m-sys.com/content/information/calcInfo.asp, 2 pages, Oct. 2001.

"The MS-Dos Filesystem," http://www.cs.adfa.oz.au/teaching/studinfo/osrts/Lectures/node113.html, 2 pages Mar. 1, 2001.

"How Flash Memory Works," http://howstuffworks.com/flash-memory.htm?printable=1, 5 pages, Sep. 2001.

"Flash Memory," Samsung Electronics, 39 pages, Jul. 2004.

Examination Report for European Patent Application Serial No. 09 006 070.8, dated Dec. 6, 2010, 5 pages.

Notice of Preliminary Rejection for Korean Patent Application Serial No. 10-2007-7002998, dated Jun. 30, 2011, 1 page.

Office Action for Japanese Patent Application Serial No. 2007-529862, dated Apr. 12, 2011, 3 pages.

Examination Report for European Patent Application Serial No. 09006071.6, dated Jul. 18, 2011, 7 pages.

* cited by examiner

| FF | FF | 03 | 04 |
|----|----|----|----|
| 05 | 06 | FF | 08 |
| FF | 0A | 0B | 0C |
| 0D | 0E | 0F | 10 |
| 11 | FF | 00 | 00 |

*Fig. 6*

| Byte 0 | 11 12 | 26 27 28 31 |
|---|---|---|
| | File 0.jpg  00  10 ... 0002  20 KB | |
| 32 | File 1.jpg  00  10 ... 0007   8 KB | |
| 64 | File 2.jpg  00  10 ... 0009  45 KB | |
| 96 | | |

*Fig. 7*

Time 0

*Fig. 8*

Time 1

METHOD AND APPARATUS FOR USING A ONE-TIME OR FEW-TIME PROGRAMMABLE MEMORY WITH A HOST DEVICE DESIGNED FOR ERASABLE-REWRITEABLE MEMORY

CROSS-REFERENCE TO RELATED APPLICATIONS

This application is a continuation of U.S. patent application Ser. No. 11/796,828, filed Apr. 27, 2007 now U.S. Pat. No. 7,861,058, which is a divisional of U.S. patent application Ser. No. 10/956,463, filed Sep. 30, 2004 now U.S. Pat. No. 7,398,348, which claims the benefit of U.S. Provisional Application No. 60/604,353, filed Aug. 24, 2004, each of which are hereby incorporated by reference.

BACKGROUND

Modular, portable, non-volatile memory devices are available that can be readily connected to and disconnected from host devices such as digital cameras, digital audio recorders, and personal computers. Traditional memory such as flash cards used in these devices is rewritable, allowing a memory address to be erased and rewritten for system or user purposes. The creation of lower-cost memory technologies that are either one-time programmable (OTP) or few-time programmable (FTP) allow new usage models with host devices that are analogous to film in an analog camera where one can simply take and print pictures while saving the low-cost card as a "negative." Ideally, one would be able to use this low-cost card in a standard flash camera, but the technologies are not necessarily compatible, as portable devices typically use the DOS FAT12/16 file system, which requires system structures to be erasable. Updating the firmware in the device with a file system customized for OTP or FTP memory technology can solve this problem, but this would limit the total available market to new cameras with the software upgrade or else would require users to upgrade their existing cameras with software in the field. Thus, there exists a need to build a hardware controller solution that allows an OTP or FTP memory card to be used in an existing camera relatively seamlessly to the end user—a backwards-compatible controller (BCC).

The preferred embodiments will now be described with reference to the attached drawings.

DETAILED DESCRIPTION OF THE PRESENTLY PREFERRED EMBODIMENTS

System Overview

The embodiments described herein can be used to enable one-time or few-time programmable memories to work with existing consumer electronic devices (such as those that work with flash—an erasable, non-volatile memory) without requiring a firmware upgrade, thereby providing backwards compatibility while minimizing user impact. As such, these embodiments are a viable way to bridge one-time or few-time programmable memories with existing consumer electronic devices that have flash card slots. These embodiments also allow future consumer electronic devices to be designed without updating firmware to include a file system customized for a one-time or few-time programmable memory.

Figure 1:
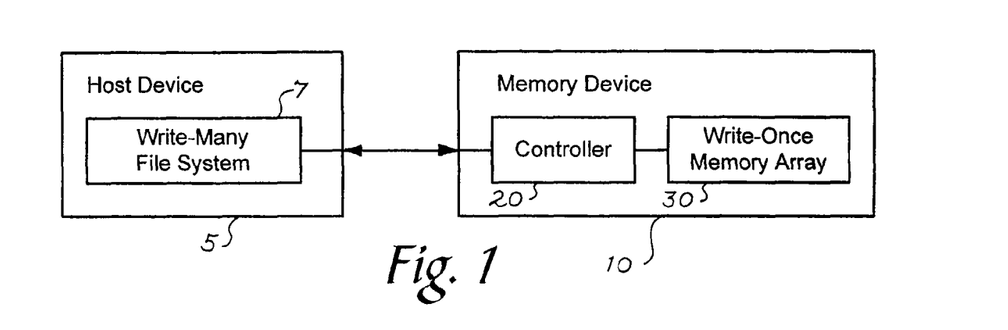
FIG. 1 is a block diagram of a host device and memory device of a preferred embodiment.

Turning now to the drawings, FIG. 1 is a block diagram of a host device 5 and memory device 10 of a preferred embodiment. Both the host device 5 and the memory device 10 comprise electrical connectors that mate with one another to electrically couple the host device 5 with the memory device 10. As used herein, the term "coupled with" means directly coupled with or indirectly coupled with through one or more intervening components. The host device 5 can take the form of a consumer electronic device such as, but not limited to, a digital still or moving camera, a personal digital assistant, a cellular phone, a digital audio player, or a personal computer (such as those with USB reader/writers or PCMCIA card adapters). In this embodiment, the host device 5 contains a write-many file system 7, such as the DOS-FAT file system.

Figure 2:
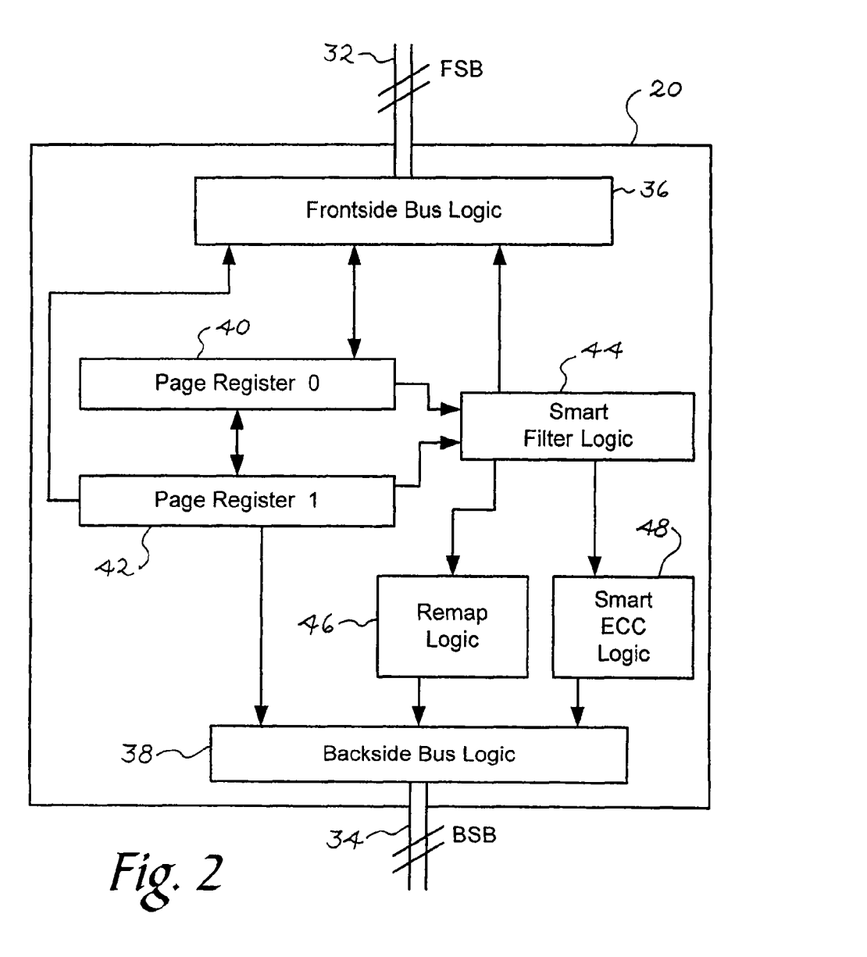
FIG. 2 is a block diagram of a controller of a preferred embodiment.

The memory device 10 can take the form of a modular, compact, handheld unit, such as a memory card or stick. The memory device 10 comprises a controller 20 and a write-once memory array 30. FIG. 2 is a block diagram of the controller 20. As shown in FIG. 2, the controller 20 comprises a front side bus 32 and a backside bus 34 coupled with front side bus protocol logic 36 and backside bus protocol logic 38, respectively. The front side bus protocol logic 36 can be configured for MultiMedia, Secure Digital, Memory Stick, Compact Flash, Smart Media, xD, USB, HS-MMC, or any of the many portable storage media available. The backside bus protocol logic 38 can be configured for NAND flash, NOR flash, or any other proprietary or public memory interface. The controller 20 also comprises two page registers 40, 42 (page register 0 and page register 1), smart filter logic 44, remap logic 46, and smart ECC logic 48. Although not shown in FIG. 2 for simplicity, the memory device 10 can also comprise clocking networks and other "glue" logic. As described in detail below, controller 20 allows the memory device 10 to be backwards compatible with a host device using a write-many file system. As such, the controller 20 will sometimes be referred to herein as a "backwards compatible controller" or "BCC."

The preferred implementation of the controller 20 is an ASIC using a finite state machine (Mealy and/or Moore) combined with standard combinatorial logic. However, the controller 20 can be implemented in a variety of other forms, such as, but not limited to, a microcontroller or a microprocessor with firmware. Additionally, while the controller 20 is separated from the memory array 30 with a backside bus 34 in this embodiment, the design can be integrated into a single die to save cost. For the most part, the design of the controller 20 in this embodiment is very similar to a controller used for rewritable memory technologies. Examples of differences are that this controller 20 preferably does not need any wear leveling or other logic associated with erasing non-volatile memory. While the design presented here could include these additional blocks and function, they would probably not be cost optimal. Therefore, one may wish to exclude them. Similarly, an ultra low-cost controller designed to work with OTP or FTP memory that uses a new software file system to avoid compatibility issues may not need more than one page register, remap logic, or smart filter logic.

The write-once memory array 30 comprises a plurality of field-programmable write-once memory cells. Field-programmable write-once memory cells are memory cells that are fabricated in an initial, un-programmed digital state and can be switched to an alternative, programmed digital state at a time after fabrication. For example, the original, un-programmed digital state can be identified as the Logic 1 (or Logic 0) state, and the programmed digital state can be identified as the Logic 0 (or Logic 1) state. Because the memory cells are write-once, an original, un-programmed digital state of a storage location (e.g., the Logic 1 state) cannot be restored once switched to a programmed digital state (e.g., the Logic 0 state). Instead of being a one-time programmable (i.e., write-once) memory array, the memory array 30 can take the form of a few-time programmable (FTP) memory array, which is a memory array that can be written to more than once but not as many times as a write-many memory array. Also, the memory device 10 can contain additional memory arrays (write-once, few-time programmable, or write-many).

The write-once memory array 30 can take any suitable form, such as a solid-state memory device (i.e., a memory device that responds to electrical read and write signals), a magnetic storage device (such as a hard drive), or an optical storage device (such as a CD or DVD). When in the form of a solid-state memory unit, the memory cells in the memory array 30 can be organized in a two-dimensional or three-dimensional fashion. In one preferred embodiment, the memory array 30 is a three-dimensional array, such as an array described in U.S. Pat. No. 6,034,882 to Johnson et al., U.S. Pat. No. 5,835,396 to Zhang, and U.S. patent application Ser. No. 09/560,626, all of which are hereby incorporated by reference.

Figure 3:
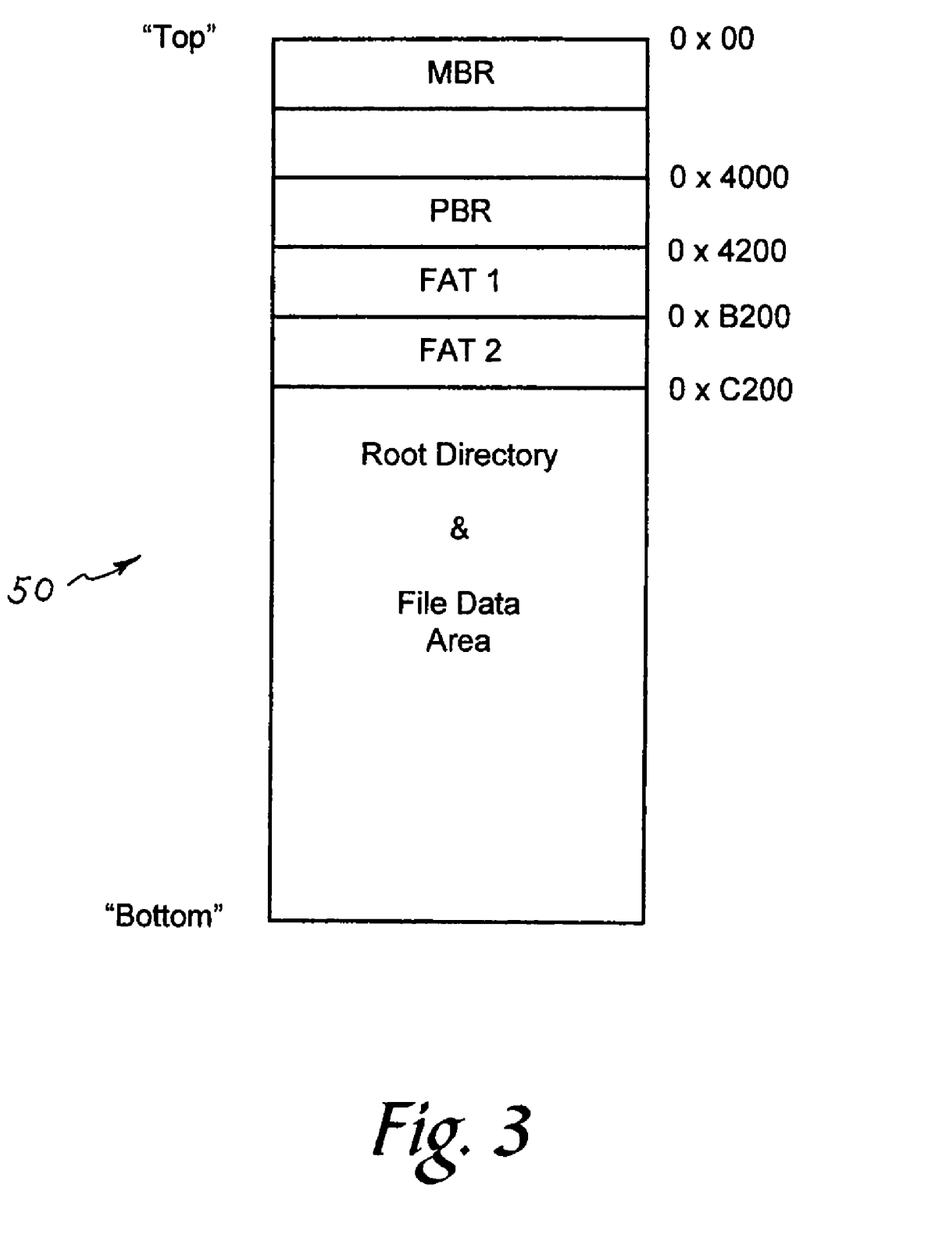
FIG. 3 is a memory map of a preferred embodiment.

To illustrate these embodiments, the DOS FAT file system (such as the Windows Operating System) will be used as an example of the write-many file system 7. It should be noted that these embodiments can be used with other types of write-many file systems. Turning again to the drawings, FIG. 3 is a memory map 50 of a typical FAT 12/16-based storage card showing various file system structures. As used herein, a "file system structure" refers to any data that describes a partition in memory, the memory space within the partition, and/or the type of commands that a file system can or cannot use with that partition. Examples of file system structures include, but are not limited to, master boot record, a partition boot record, a file allocation table ("FAT" or "FAT table"), a root directory, and a sub-directory. The master boot record (MBR) is used to store boot information for the card (i.e., the memory device 10) as well as the starting location of each logical partition. Most memory cards, such as the one shown here, only contain one logical partition. In this example, the partition boot record (PBR), which contains information such as cluster size, number of clusters, partition type, partition name, etc, starts at address 0x4000. FAT1 corresponds to FAT table one, which contains a linked list of clusters numbers for each file, directory, and other information on the card 10. FAT2 corresponds to FAT table two. Lastly, the root directory and file data area begin at physical address 0xC200. These areas are divided into clusters, corresponding to the cluster numbers in each FAT table. For the purpose of this example, assume each cluster is exactly 4 KB in size. Note that this is only an example of a FAT File System and in no way intended to limit the invention. Different locations for each structure, different cluster sizes, and even different file systems can be associated with the embodiments described herewith.

With the general components of the system now described, the smart filter logic 44, the remapping logic 46, and the smart ECC logic 48 of the hardware controller 20 will be discussed to illustrate how these logic blocks can be used to allow a host device designed for erasable flash memory to use OTP memory practically seamlessly. These logic blocks take advantage of the fact that many existing host devices do not send erase commands but instead rely on the controller 20 to perform any erase management (e.g., wear leveling and garbage collection). A host device simply expects that the most recent data written to an address be present when that address is read at a later time. As mentioned above, a controller can use some or all of these logic blocks, and the use of all three logic blocks is not required in the claims unless explicitly recited therein.

The Smart Filter Logic 44

The smart filter logic 44 allows the controller 20 to intelligently modify host operations based on the desired user behavior. One form of smart filter logic 44 performs a read-before-write operation to compare the data requested to be written at an address to the data that was previously written to that address (i.e., comparing "new" data with "old" data). In the simplest case, the smart filter logic 44 can perform a remap operation if there is any modification of data previously written, but this may result in an undesirable user model. By adding complexity and intelligently looking at the differences in the data, the controller 20 can infer what the host device 5 is attempting to do and can then choose to perform one of the following operations: write new data to the address, "fake write" the data (i.e., telling the host device 5 that the write operation was performed successfully, while, in reality, nothing was written), disallow the write and generate a card error, or perform a remap operation. This is illustrated in the flow chart for FIG. 4. As shown in this figure, a write operation is received by the backwards-compatible controller 20 (act 60). If data is bring written to a blank page or if data is being appended (act 65), the controller 20 writes the data as requested by the host device 5 (act 70). If the "last accessed" field is being updated or an attempt is made to "zero" the FAT table, the controller 20 performs a "fake write" (act 80). If the write is to the PBR or if there is a remap zone collision (act 85), the controller 20 generates a card error (act 90). In response to any other write operation (act 95), the controller 20 performs a remapping operation. These branches will be described in more detail below. It is important to note that the smart filter logic 44 can implement all four branches shown in the flowchart, fewer than all four branches, or additional branches not shown.

Figures 4, 5:
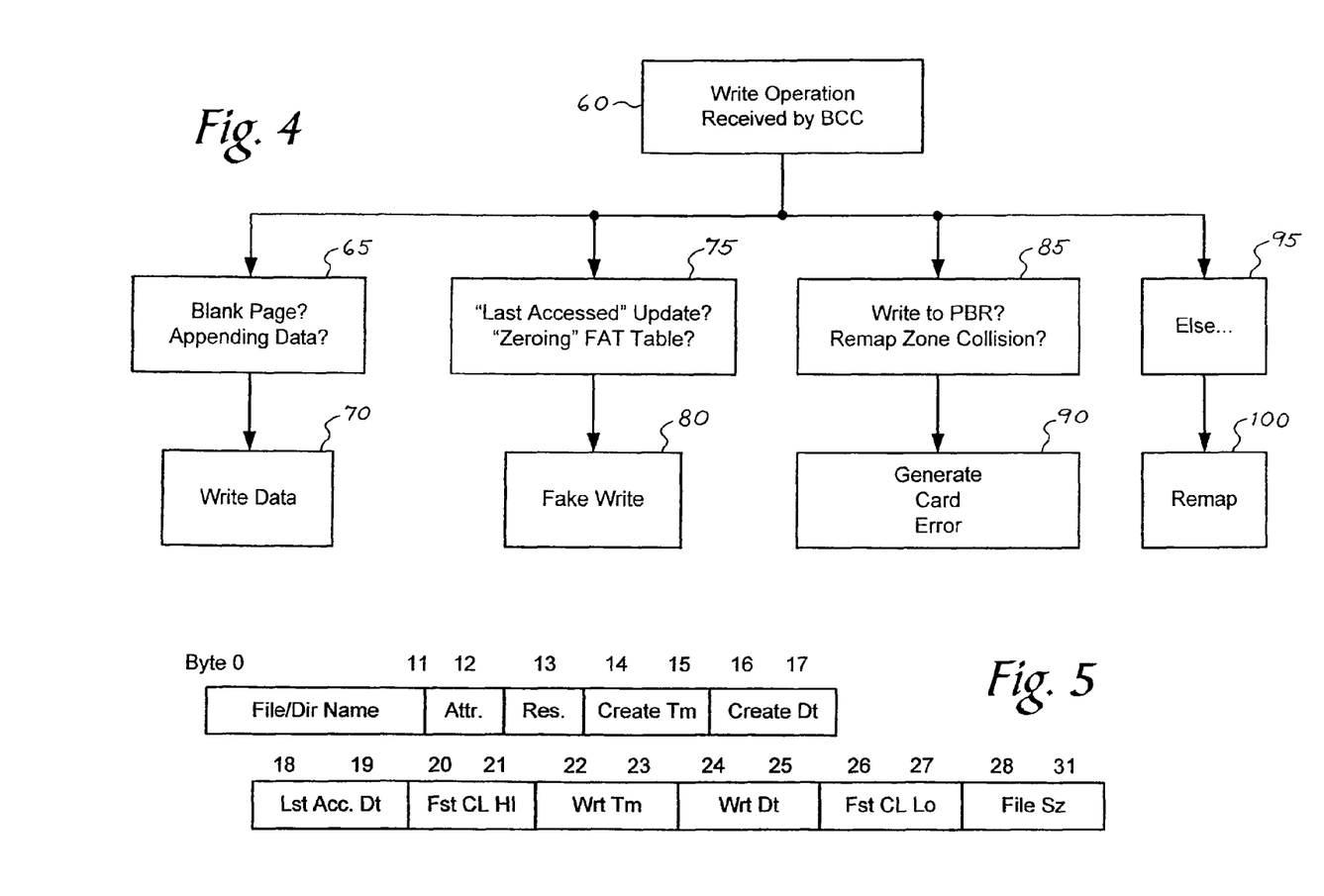
FIG. 4 is a flow chart illustrating an operation of smart filter logic of a preferred embodiment.
FIG. 5 is a diagram of a 32-byte file listing structure of a preferred embodiment.

As illustrated in FIG. 4, the smart filter logic 44 preferably performs differently depending upon where the data is being written. Accordingly, it is preferred that the smart filter logic 44 monitor not only the new data but also the address requested from the host. For example, the filter that is in place for a write to the FAT table can be different from the filter that is in place to write to the user data area. Thus, the controller 20 preferably has knowledge of the address of the FAT tables and other file system structures on the card 10. This can be performed by making these addresses static and hardcoded into the logic, by having the controller 20 read and interpret the MBR and PBR at startup, or by saving the addresses in a "magic page" that provides various configuration data at power on.

To fully comprehend smart filters, it is first required to understand the operations a user could perform on a memory device and how they are translated to commands that manipulate the file system structures and data. First, let's describe what happens in the case where a user takes a picture, copies a file, saves a new file, or moves a file onto a memory card. Although these operations can vary from device to device, they do follow some general trends. First, the host device will read either or both FAT tables to determine where free space is available on the card. This free space is represented as 0x0000 in a FAT16 file cluster. Next, the host will write the first 26 bytes of the new 32-byte file listing into the appropriate directory cluster. The memory map of this 32-byte structure can be seen in FIG. 5. Next, the host will allocate the memory to be used for the file into the FAT table by writing the linked list of clusters. After the memory has been allocated, the host will write the file data to the appropriate clusters. Note that this allocation and writing can be done in either order and that it can also be separated such that a single cluster is allocated and data-written to at a time. After all the data is written, the final six bytes are written to file listing to state the beginning cluster number and the file size.

Figure 6:
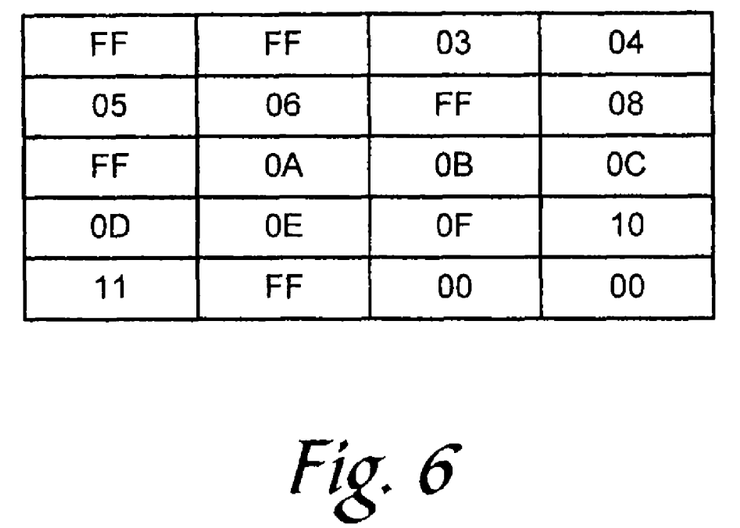
FIG. 6 is a diagram of a FAT table of an embodiment.
Figure 7:
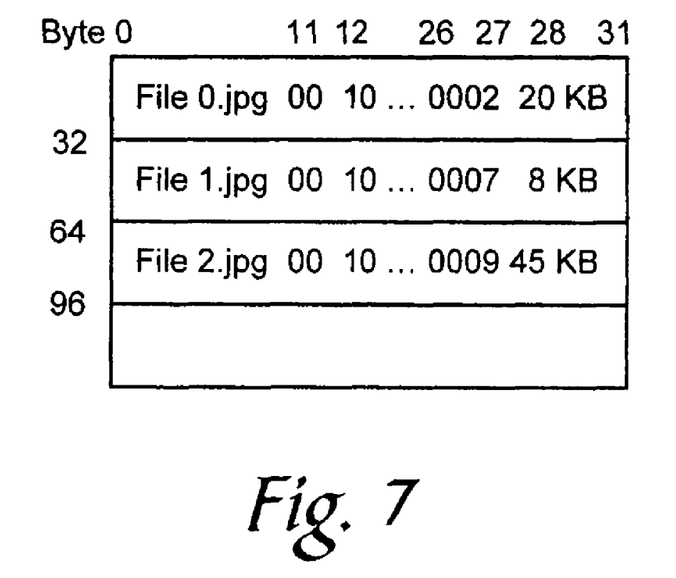
FIG. 7 is an example a file listing associated with the FAT table of FIG. 6.

An example of this can be seen in FIGS. 6 and 7. Let's assume the host is writing File2.jpg to unused space in memory. The file name, attribute information, etc. would first be written to the appropriate directory. Then, the FAT table would be updated for the file, here starting by writing 0x0A into cluster 0x09, signaling that the next cluster is in cluster A. The linked list is written until the end of file is signaled with 0xFF written into cluster 0x11. The host then writes the file data to the card to the newly-allocated clusters (once again, this operation can be separated into allocating a single cluster at a time until the end of file is reached.). Finally, the last six bytes are written to the file-listing showing that File2.jpg starts at cluster 0x09 and is 45 KB in size.

A new directory is created in a very similar manner to creating a new file. In fact, a directory and a file are exactly the same in a FAT file system implementation except for the directory attribute bit. Thus, a host creates a directory by first writing the directory name and attribute bits to the appropriate directory (the ROOT directory is defined at the beginning of the user data area after FAT2). Next, the cluster for the new directory is allocated by writing 0xFF into the FAT tables. Inside any newly-created directory are the files "." and ".." which point to the directory and its parent respectively (the "." file cluster number is the same as the directory cluster). After these two files are written, the host then completes the directory listing by writing the final six bytes to the 32 byte listing.

Another example of a user operation is deleting a file previously written to a card. A FAT-based operating system does not typically erase file data or the file name from a card when a user deletes. Instead, the character 0xE5 is written to the first byte of the file listing, and the clusters for the file are unallocated by writing 0x00 to their locations in the FAT tables. Any host that reads "E5" as the first character in a file listing will know to skip this file as it has been deleted. This also gives the opportunity to recover the file by rewriting the correct character into the file and reallocating the original clusters.

Each file in a memory contains a 32 byte file entry that contains information such as the file name; file attributes such read only, hidden, directory, archive; file creation date; file last accessed date; file size; and first cluster entry. To rename a file or change its attributes (e.g., hidden, archive, read-only), a host 5 will simply send a write command with data that writes the new file name or attribute bits to the original listing. In general, the controller 20 allows the host 5 to modify any of these parameters by implementing a remap operation. However, a controller may choose to save memory by performing a fake write when the "Last Accessed Date Field" in the file listing (bytes 18-19 in FIG. 5) is updated. The reason for this exception is that some hosts, such as Microsoft Windows, will write a new date to this field each time a file is read, which can cause 512 bytes of memory to be used for a remap. This is an example of a system performing a write operation without the user's knowledge. To avoid this, the smart filter logic 144 can choose to not implement this particular update. The implications and handling of these hidden operations will be discussed in greater detail later in this specification.

A user can also choose to format a memory card. This is performed in a variety of ways by host devices. Some devices will simply write 0's to the FAT and root directory, thereby "freeing" all memory space. Other hosts will attempt to reformat a card by rewriting the MBR and/or PBR with new information, then zeroing the host and root directories. Yet other hosts will perform one or all of the above as well as writing 0's to the entire card to ensure all memory space is cleared. Finally, some hosts will perform one or more of the above operations and also use an erase command to ensure that all data is completely erased and ready for new data.

The final operation that a user can attempt is very broad—modifying existing data. A user can choose to rotate a picture on a camera, resave a picture to the card after using a tool to improve color or another variable, or any of many other operations. Host devices can perform any of these operations in a variety of different ways ranging from writing a new file and erasing the old file to simply overwriting the appropriate clusters of the old file with new data.

Now that we have a basic understanding of how a host performs different user operations, we can begin to understand smart filters and how they work. The BCC controller will perform a read-before-write (RBW) when it receives most write commands. The memory device is preferably read immediately upon receipt of the desired write address from the host. This will allow a performance improvement as the controller 20 can read the desired data and insert it into Page Register 1 (PR1) 42 while the host 10 is sending the new data that is moved into Page Register 0 (PR0) 44. More details on this RBW operation are in the remapping description later in this document. Various examples of the smart filter operation will now be given in conjunction with the FAT table shown in FIG. 5.

To create a new file or directory, the host device 5 will write a new 32-byte file entry in the appropriate subdirectory and update the FAT table to allocate the correct memory space. If the host device 5 is attempting to write a new file, it will try to allocate the final two clusters in this figure, most likely with the values 0x13 and 0x14 respectively. Looking at the flow chart in FIG. 4, this would correspond to "Appending Data" as no data is being modified. Therefore, the smart filter logic 44 would simply write the data to the original address with no changes. In this general case, the controller 20 allowed the host device 5 to simply overwrite free space for the new file. However, in some cases, the space may appear to be free to the host device 5 due to a previous delete, but, in actuality, the memory was never erased. In this case, the smart filter logic 44 can implement a remap operation for the new data to replace the old data, as described below.

To delete a file, the host device 5 performs two functions. First, it overwrites the file's cluster pointers in the FAT table with "00h" to show the host device 5 that the data area is now available. In the case of an OTP or FTP memory, it is very likely that the memory cannot be erased and, therefore, the controller 20 would not want to "free up" memory that way. In other words, the controller 20 preferably uses remapping algorithms to make it appear that the host device 5 has modified data, but, in reality, one can never actually erase and get this free space back. This is why the smart filter logic 44 preferably never allows a host to write 0x00 to a cluster that was previously allocated. This action is called a "fake write" in FIG. 4. Specifically, the controller 20 tells the host device 5 that the 0's were written to the memory but will not actually commit any write. It is important to understand that writing 0's to the FAT table would make a user think that more space was available on the card than there real is, therefore giving a poor user experience if the card appeared to have more space, yet new data could no longer be written. Second, the host device 5 overwrites the first character of the 32-byte file entry with "E5h," signifying to the FAT file system to skip the file. When the host 5 sends a write command to the controller 20, the controller 20 performs a Read-Before-Write operation to enable the comparison of previous and new data. At this time, the smart filter logic 44 enables a remap operation to overwrite the original file's first character with "E5h," as described below.

The last example of smart filtering in the FAT table occurs when the host 5 attempts to change data by writing something other than 0x00 to a previously-written cluster. This can occur, for example, if a file is modified and extended in length (e.g., adding data to a thumbs.db file to grow it from 16 KB to 24 KB). Here, the end of file marker, 0xFF, would be replaced with a cluster number pointing to the newly added data. In this case, a remap operation would occur, allowing the host 5 to modify the data as desired.

Figure 8:
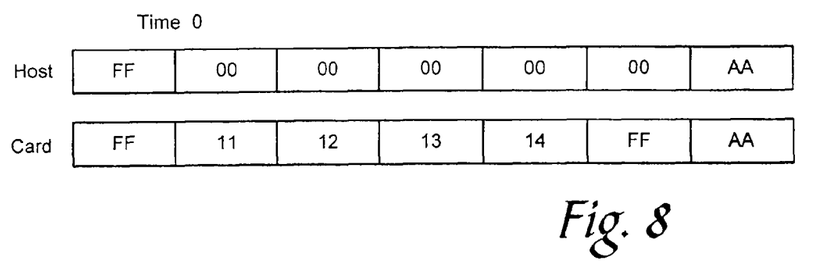
FIGS. 8 and 9 illustrate a smart filter operation of a preferred embodiment.
Figure 9:
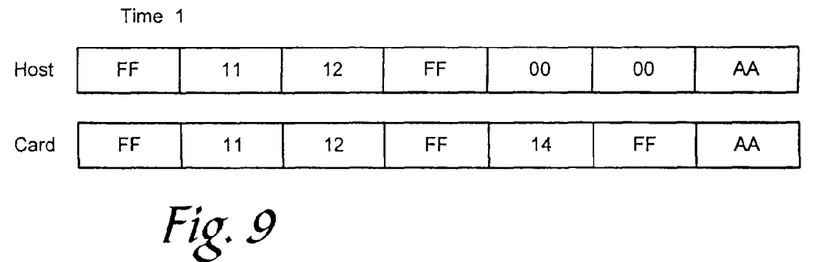

It is important to understand that, with a fake write operation, there is a discrepancy between what a host believes is written versus what is actually in memory. In a host system that caches the FAT table in volatile RAM such as Windows, this means that more than one smart filter may be applied with a single operation. For example, assume a user deletes a 1 MB file in one operation, and the BCC 20 fakes the zeroing of 1 MB worth of clusters in the FAT table. Next, assume the user attempts to write a 500 KB file to the memory 30. In this case, the host 5 will attempt to place the new file in the clusters freed by the delete operation. It would, therefore, write the new cluster allocation and leave the remaining clusters 0x00. The smart filter must, therefore, remap the new file's clusters while at the same time not zeroing the previously-faked space. This example can be seen in FIGS. 8 and 9. At Time 0, the fake write keeps the values 11-FF on the card, and, at Time 1, the new file's clusters 11-FF are written to the card through a remap operation, yet 14-FF are also kept to ensure no space appears to have been freed.

In this embodiment, smart filters for the data area vary from those in the FAT tables. The data that can be stored in the user area is limited to 32-byte file/directory listings and clusters of actual file data. In the simplest case, once again, a smart filter can choose to remap any data that is writing over non-virgin space. But, once again, this would result in an undesirable usage model as the hidden system operations mentioned earlier would use additional memory space for remaps that the user did not care about. To avoid these superfluous remap operations, the BCC controller 20 preferably compares the data in page register 0 and page register 1 and performs a fake write if the only change or changes are associated with a specific field, as shown in FIG. 7. For example, if data in page register 0 matched data in page register 1 exactly except for the two bytes at offset 18, the controller 20 would determine that the host 5 was attempting to update the "Last Accessed" field and would, therefore, perform a fake write operation. Therefore, the host 5 would believe the field was updated, but, in reality, no write took place.

Any delta or combination of deltas of known file system structure fields can be applied to a smart filter. For example, suppose a designer determines that OTP memory should not be modifiable by a user, and, therefore, any rename or delete operation would be not allowed. In this case, a filter operation can detect changes to bytes 0 to 11 and can perform a fake write. Further, suppose a designer decided that renames were okay, but making a file hidden was not allowed. If a user attempted to rename a file and change the attribute bit, the smart filter logic 44 could detect that this was occurring to the appropriate fields and can remap the data with the new name but not change the attribute bit to allow the file to be hidden.

The last operation that can be called by smart filter logic is to signal an error. In the preferred embodiment, this will only occur in two instances: (1) if the user attempts to format the card 10 or (2) if the card 10 is full and no more data can be written. To format the card 10, the host 5 performs at least two operations: clear the FAT table and update the PBR with the desired format information. In this situation, the controller 20 detects that a write operation is occurring above the FAT tables (addresses 0x0000-0x4000 in FIG. 3) and will set some set of error bits when responding to the host's command. These can be CRC errors, write failure errors, or any other status error signals appropriate for the card form factor. Additionally, the controller 20 can once again "Fake" any writes that attempt to zero the FAT table. When the card 10 is full and no more data can be written, the controller 20 can detect through the FAT table or the write addresses that the card 10 is full. At this point in time, no additional data can be written, and an error is signaled. Additionally, any write protect bits can be set to signal to the user that the OTP card 10 is now full and essentially a ROM. The controller 20 can detect that the card 10 is full in a variety of ways, ranging from detection in the FAT table to noting an overlap of remap addressing and host write addressing.

The previous examples all assumed hosts do not send an actual erase command to delete file or system data but instead rely on a controller to perform this operation. In practice, however, some hosts do have the additional complexity required to either perform erase operations themselves or invalidate physical and logical blocks and perform erase operations at a later date. An example of a system like this is the Smart Media interface, where the specification shows how to create a logical blocks in the sideband area of the memory, mark invalid flags, and perform other more complex operations. It is important to note that the concept of smart filters can easily be applied to this type of system as well, where the controller would intelligently perform set operations based on the comparison of old and new data, regardless of whether the operation was a write, erase, or other command.

In summary, when looking at each individual operation a host can perform, the smart filter logic may appear to be relatively complex. However, upon closer inspection, one can see patterns for the behavior. If the controller 20 is sold preformatted, the address of the PBR, the FAT tables, the root directory, and the data area are known. If the host 5 attempts to overwrite the PBR, the controller 20 preferably forces a card error, as this will change the format of the card 10. Due to the OTP/FTP nature of the memory array 30 technology, the controller 20 preferably fakes any writes that attempt to free space on the card 10 by writing 00h to a previously-written address in the FAT. Similarly, undesirable updates to a file entry such as the last accessed field can be faked for improved memory utilization. If the host 5 writes to virgin memory space, the smart filter logic preferably allows the write to continue uninterrupted. And, to err on the side of caution, if the host 5 overwrites previous data in a way that smart filter logic 44 does not understand, the write can preferably be remapped to allow the host operation to continue successfully. Lastly, it is preferred that care be taken for combinations of filters that can cause the controller 20 to perform multiple functions for a single write command. For example, if the host 5 has cached the FAT table and attempts to erase a large file and then copy a small file in the "freed space," the controller 20 preferably allows the new file to be written without freeing up additional space in the FAT tables (the mismatch of the cached FAT vs. the actual FAT that has been filtered causes these combinatorial issues).

The Remapping Logic 46

The remapping logic 46 can be used to move data to a new logical address that allows the host device 5 to believe it has erased a specific address. Remapping is a term used to describe data and address indirection by the memory controller 20. It refers to the concept of writing data at a different physical location than the logical address supplied by the host 5. Remapping is used by a variety of technologies, including flash memory, for reasons varying from performance improvement to improved data integrity through wear leveling algorithms. For an OTP or FTP memory enabled with BCC, however, remapping is unique in that it is used to mimic erasability. For example, if a host requests dataset A to be written to address 0, the controller 20 can choose to write the data at address 0. Later, the host 5 may want to change the data from A to B, such as when writing the character "E5" to perform an erase operation as described earlier. At this time, the controller 20 would use a smart filter to determine that the host 5 was properly modifying dataset A and would write dataset B to a different physical location, such as address 1. Now, when the host 5 reads address 0, the controller 20 must know to return the data located at address 1 instead, thus making the memory appear modified to the host 5 and user.

There are many methods for redirecting data from a host device. See, for example, the following patent documents, which are assigned to the assignee of the present invention and are hereby incorporated by reference: U.S. patent application Ser. Nos. 09/877,719; 09/878,138; 10/327,680; and 10/023,468. One common method is to use a physical-to-logical-address table that is read or calculated at startup and then stored in volatile memory in the controller 20, but this table can be very large and would add die size and cost to the controller 20. For the implementation described here, it is preferred to keep cost as low as possible without compromising performance beyond the applications' requirements. In the preferred embodiment, there are two methods of remapping.

The first and simplest scheme is to use the "sideband area" of a memory page that is not visible to hosts. In the presently preferred embodiment, the memory array 30 is organized in 528B pages, but the FAT file system uses a 512B sector. These extra 16B are referred to as the sideband and can be used by the controller 20 to store extra information including, but not limited to, ECC data, data and address validity flags, and remapping pointers. In this scheme, the controller 20 uses part of this sideband to store a physical address if the page has been remapped. If the page is written for the first time, no remap pointer will be needed, as the physical and logical address will be the same. When the host 5 attempts to modify the data, the controller 20 will write the new data to a new location and store the physical address of this location into the sideband of the old location.

Figure 10:
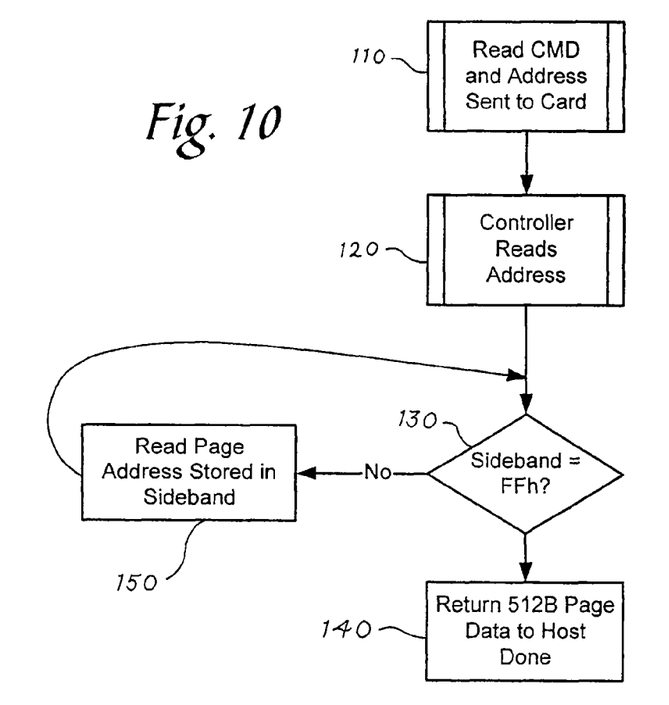
FIG. 10 is a flowchart of a method of an embodiment for reading data when a sideband area stores remapping information.

FIG. 10 contains a flow chart illustrating how data is read under this remapping scheme. First, a read command and address are sent to the card 10 (act 110). The controller 20 knows to read the entire 528B page (or as much as needed to include the pointer) (act 120) and determines if the sideband contain FFh (act 130), which tells the controller 20 whether or not the address was remapped. If the pointer is virgin (i.e., contains FFh), the controller 20 returns the 512B page to the host 5. If the sideband contains an address, the controller 20 reads the page address stored in the sideband to find the most-recently written data. This address can be stored directly in the sideband or an offset of an address can be stored. This form of remapping is referred to as static because the controller 20 does not modify the FAT table to allocate additional space used for remapping. In this implementation, the card 10 has been preformatted with a set amount of remap data already allocated in the FAT table. Once this amount of data has been used, remaps can no longer take place. The FAT table shows remap allocation so that the host 5 does not attempt to use this space for its own purposes (e.g., storing picture data).

This first remapping scheme is very powerful and requires very little logic overhead to implement. It does, however, come with a relatively high performance overhead as a page that has been remapped N times will require N reads to find the current data. Another simple remapping scheme can be used in its stead to improve on this performance. Here, instead of storing a pointer to the remapped page, a pointer to a remap table will utilized. This table can use a temporal-to-spatial mapping technique to store the most up-to-date page data. Temporal-to-spatial mapping is described in U.S. Pat. No. 6,738,883, which is assigned to the assignee of the present invention and is hereby incorporated by reference. Now, a page that has been remapped N times can be read in at most three reads, greatly improving performance of the product with very little additional cost and complexity.

It should be noted that the controller 20 preferably performs these reads to find the newest page each time an address is accessed. For each smart filter operation described earlier where the controller 20 performs a read-before-write, the controller 20 preferably also walks the chain of remaps to find the most-current page.

It also should be understood that additional complexity can easily be added to these algorithms. For example, one or more of these algorithms can be used with another to improve performance while minimizing complexity. Another example of complexity would be to use the strong locality dependence of data in the FAT file system to perform cached read operations, where the controller 20 would read a page and the pages near it to find data in parallel with other operations being performed by either the host 5 or the controller 20. While this will add some cost to the controller 20, it can greatly reduce the read-before-write and remapping-walking overhead.

One other large distinction from standard remapping algorithms that a BCC controller 20 can implement is used to solve the issue of flow control to the host 5. In other words, if the controller 5 is moving data to new locations without the host's knowledge, and the host 5 believes this data is actually being erased and rewritten, how does the host 5 know how much free space is actually available? To solve this problem, the BCC 20 implements two separate operations. First, as described earlier, the smart filter logic 44 keeps the host 5 from writing 0's in the FAT tables to free up space. This will keep user-controlled operations, such deleting a file, from appearing to erase and open memory. However, memory consumed by the controller 20 for remapping must be accounted for as well.

One simple way to solve this problem is to allocate memory for remapping before the time of sale of the memory device 10. This static amount of remapping can be used by the controller 20 until there is no more pre-allocated space left. At this time, the controller 20 can signal a card error, allow any write that is not a remap, or many other operations. One can see that this method, referred to as static remap allocation, may be undesirable, as it limits the number and size of operations that a user can perform.

Figure 11:
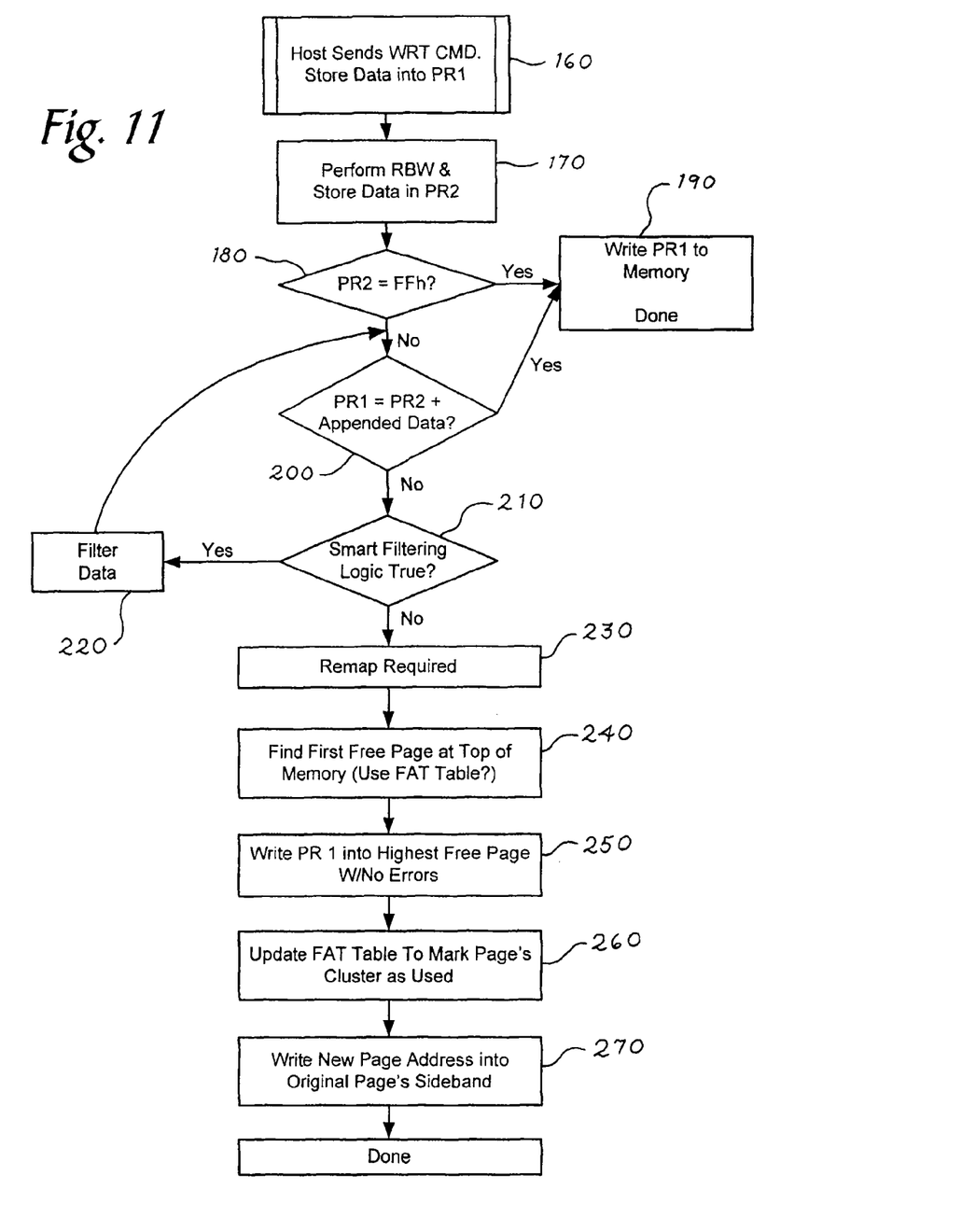
FIG. 11 is a flowchart of a method for dynamic remapping allocation of a preferred embodiment.

A more complex form of remapping, called dynamic remap allocation, solves this problem. A flow chart for this method can be seen in FIG. 11. First, the host 5 sends a write command, and the data is stored in page register 1 (act 160). Next, the controller 20 performs a read-before-write (RBW) operation and stores the data in page register 2 (act 170). If page register 2 is empty (i.e., contains FFh) (act 180), the contents of page register 1 are written to the memory array (act 190). If not, the controller 20 determines if the contents of page register 1 equals the contents of pager register 2 with appended data (act 200). If it is, the contents of page register 1 are written to the memory array (act 190). If it is not, a determination is made regarding whether the smart filtering logic is enabled (act 210). If it is, the data is filtered (act 220). If it is not, a remap is required (act 230). To perform the remap, the first free page at the top of the memory is found (act 240), and the contents of page register 1 are written to the highest free page with no errors (act 250). Then, the FAT table is updated to make the page's cluster as used (act 260). Finally, the new page address is written into the original page's sideband (act 270). While two page registers are shown here to provide a performance savings (e.g., the read-before-write occurs when the address is available and before data input from the host 5 is complete), it is possible to use a single page register.

Figure 12:
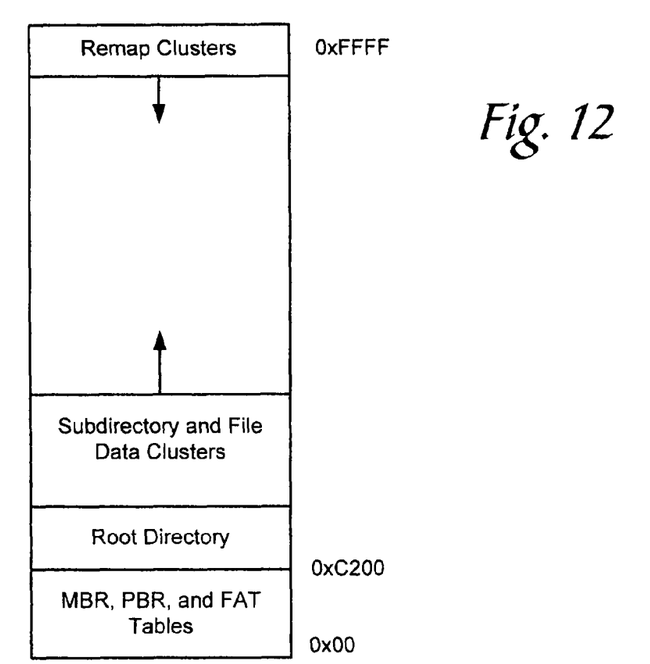
FIG. 12 is a memory map used in a remapping example of a preferred embodiment.

As illustrated in the flowchart, the controller 20 informs the host 5 that space has been used for remapping by writing to the FAT table. As additional memory is needed, the controller 20 can allocate a new cluster for its own use just as the host 5 would allocate a cluster for file data. That is, this scheme uses the same pointer chasing algorithm as described above but also dynamically updates the FAT table as additional space is needed for remapping. The benefit of this implementation is that the host 5 and user are not limited in the number of remaps/file modifications they can perform. The controller 20 will allow them to remap until the card is completely full. In this preferred embodiment, the controller 20 allocates memory from the bottom up, as most hosts allocate memory from the top down, as shown in FIG. 12. This allocation scheme will allow the controller 20 and host 5 to independently allocate memory with a very small chance of allocation collision occurring. This also allows the controller 20 to acknowledge that the card 10 is full whenever the two allocation zones collide. At the time the card is full, the controller 20 may choose to set its permanent and temporary write protect registers, signaling to the host 5 that no more writes to the card 10 are possible. A non-cached system will know how much memory is left, while a cached system will read the FAT table at startup to see how much remap space was used prior to that particular session.

Once again, it should be noted that static and dynamic remapping are not mutually exclusive. In fact, to assist the user, one may choose to implement both in a single product. For example, a user may want to delete or modify files even though the card is full, and no additional files can be added. Additional data modification can be allowed if a set amount of memory is pre-allocated and not used under normal operation. For example, the card 10 can have 500 KB of static remap set aside that the controller 20 does not use until the card 10 appears full due to host and controller allocation collisions. At this time, the controller 20 can allow the host's additional data to be written to the static allocation zone until the desired operation is complete. Later, smart filters can be used to allow some user operations such as delete and renames to occur in the static area, while other operations would result in an error, as the card 10 is essentially full for most use.

In yet another example, this static allocation area can be accessed by a host that has been updated with software for BCC technology. A PC or other electronic device can be enabled with an application that sends a signal to the card that would allow the application explicit access to all of the card memory, as described in U.S. Pat. No. 6,424,581, which is assigned to the assignee of the present invention and is hereby incorporated by reference. At this point, the application would override any smart filters, remaps, etc. and can be used to improve performance by optimizing remap chains or even allowing additional operations into the static area that a non-enabled system could not. Thus, combining static and dynamic remap algorithms can provide an optimal user experience with both enabled and non-enabled systems.

Further, other implementations are possible to replace the simple pointer-chasing scheme described above. Some are listed below:

Read3 Command: A faster read command can be used, known as READ3, that would allow the controller 20 to only read the sideband data. This would reduce the overhead of reading many full pages of data before finding the most recent data.

Table of pointers: To reduce the performance hit of reading each page to find the most recent write, a table of pointers can be used such that each page would have a table that listed all the remaps. The host 5 would read the table and use the last pointer before a virgin entry to determine the most recent update. The table address itself would be stored in the page's sideband. This is similar to the table used in hardware remapping described in the patent applications referenced above.

System Cache: The controller 20 can use a SRAM or similar cache to store the data from a remap table or pointers stored in the sideband. While the additional SRAM costs area and, therefore, makes the controller 20 more costly, this architecture would allow the remaps to occur extremely quickly and minimize performance overhead.

Combination of Remap Algorithms: The controller 20 can create a remap utilization flag that would signify whether the simple pointer chasing or table schemes are being used. Thus, if the controller 20 sees that a page has been remapped many times, it can choose to create the table to reduce the impact of future remaps. But for the simple case where a page is only remapped a couple times, the pointer scheme would be sufficient. The controller 20 can set this flag dynamically, or it can be static and based on the remap location. For example, the FAT table will be remapped many times, and, therefore, it may make sense to always use a table or SRAM scheme, while the data may not be remapped often, and, therefore, it may be preferable to use the pointer chasing scheme here. This implementation may reduce the cost of the SRAM while still providing close to optimum system performance.

The Smart ECC Logic 48

It is preferred that ECC be used to protect against reliability errors that may occur in the field. In the presently preferred embodiment, the BCC 20 uses the sideband to store the ECC data as well as the remapping pointers described above. The ECC can be 8-byte, 16-byte, or any suitable size for the sideband availability. In the presently preferred embodiment, a 128B ECC algorithm is used, which is referred to herein as "smart large block ECC." Large block ECC ("LB ECC") uses two closes per ECC word and is discussed at Appendix I. As the BCC 20 utilizes the sideband for both remap and ECC information, the sideband may not have enough space to store two ECC closes per word, per the normal large block ECC scheme. Accordingly, this large block ECC scheme is made "smart" by only closing each word one time—when the final two bytes of a word have been written. The value of two bytes is chosen because each entry in the FAT table is 2 bytes in size. (When performing dynamic remapping in combination with LB ECC, the controller 20 preferably considers ECC close operation to ensure maximum reliability of the product in the field. In other words, the allocation is preferably should not close the ECC word in the FAT table and subsequently update the same word at a later date.) One can also have the close operation dependent upon the data area. For example, when updating the FAT table, it might make sense to update based on a two-byte segment as described above, but this may not make sense when updating the data area. When updating the data area, the close operation can be performed based on the last six bytes in a word as most hosts update the final six bytes of a file entry only after completely writing all the data. Finally, the BCC 20 may choose to implement a remap operation if it detects that a previously closed ECC word is being updated. This would utilize the remap operation in combination with ECC to preserve maximum reliability in the field.

U.S. Pat. No. 6,738,883, which is assigned to the assignee of the present invention and is hereby incorporated by reference, shows the use of ECC as a method for improved data reliability in an OTP or FTP product. As discussed in this patent, an ECC word can be written once and only once. Overwriting new data in an ECC word would cause the ECC data value to be rendered incorrect, thus removing the layer of reliability required for the product. In a system that has been enabled to work with OTP or FTP memory, this can easily be handled by creating the concept of a line, the minimum write size to the memory, which is discussed in the above-referenced '883 patent. However, it is preferable to compensate for the situation where a BCC product is used in non-enabled systems (i.e., hosts that are not enabled with the concept of octbyte alignment) with design complexity.

The BCC controller 20 can maintain ECC integrity in many ways. One simple method would be to invoke a remap operation whenever an ECC word was invalidated. Here, the controller 20 would detect if an ECC word is being overwritten with a smart filter or other logical scheme. In the case of invalidating an ECC word, a remap operation would rewrite the data with new ECC data, therefore keeping a very reliable product.

While remapping can be used to keep 100% ECC coverage of the memory, it may result in many additional remaps, thereby limiting the number of operations for the user. In this case, the controller 20 may be designed to improve ECC handling. In the preferred embodiment, ECC data will not be written and the ECC word will not be finalized until a specific portion of the data is written. For example, assume the ECC word is 32 bytes. In the case of writing a file described previously, the host 5 will write 26 bytes of file listing data and later write the final six bytes after the file data has been completed. In this case, the controller's ECC smart filter logic 48 can determine that a file listing was being written and not finalize the ECC word until the final six bytes are written. This would maintain ECC integrity, while minimizing remap overhead. This scheme can be modified for a variety of ECC word size, file system structures, and data structures.

In summary, the smart ECC logic 48 in the presently preferred embodiment uses a 128B ECC word with the syndrome bits stored in the sideband, closes a word based on writing the final two bytes of data, only allows one close per word, uses a different closing scheme for FAT table vs. data area (2B vs. 6B close), and can use remapping if the ECC word is invalidated or broken. The smart ECC logic 48 is used in this embodiment because the sideband space is not sufficient for multiple ECC closes.

CONCLUSION

There are many alternatives that can be used with these preferred embodiments. For example, instead of being implemented in a controller in a memory device, any or all of the smart filter logic, remapping logic, and smart ECC logic can be performed, in whole or in part, in another component, such as another controller in the memory device or in the host device. Further, the term "circuitry" refers to any component that can implement the function described to it. Examples of circuitry include the examples given above as well as a processor running computer-executable instructions, an application specific integrated circuit, a field programmable gate array, an analog circuit, or any other hardware device (running or not running software) that is now-known or later-developed, and any combination thereof.

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

APPENDIX I

Large Block ECC Implementation

Overview

Large block ECC preferably includes the following:

ECC word size of 128B.

Single error correction, but no double error detection.

Smart ECC updates that allow at most two ECC parity updates.

SEC ECC Implementation

Figure 13:
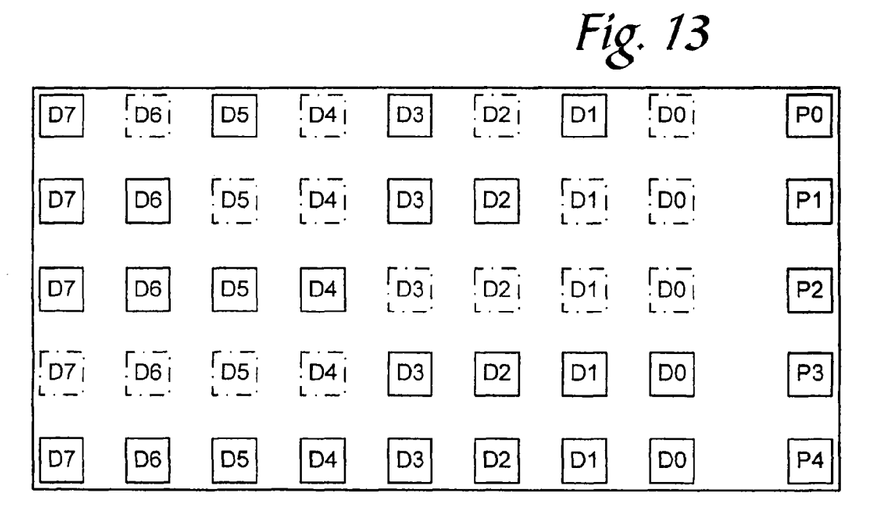
FIG. 13 is an illustration of a parity bit layout of a preferred embodiment.

The ECC implementation is similar to an implementation that allows the ECC parity bits to be calculated per byte. To reduce parity bits since storage in the sideband is limited, the following modifications have been made to do SEC only without DED. FIG. 13 shows how the parity bits would work for an 8-bit data example:

P0 covers D1, D3, D5, D7.

P1 covers D2, D3, D6, D7.

P2 covers D4, D5, D6, D7.

P3 covers D0, D1, D2, D3.

P4 covers all data bits.

The following table shows the syndromes that would result from any one-bit error. Syndrome[4:0] is created by XOR'ing the expected and actual parity bits. This algorithm preferably requires N+2 parity bits to cover $2^N$ bits. For an ECC word of 128 bytes ($2^{10}$ bits), 12 parity bits are preferably required.

| ERROR BIT | SYNDROME[4:0] |
|---|---|
| D0 | 11000 |
| D1 | 11001 |
| D2 | 11010 |
| D3 | 11011 |
| D4 | 10100 |
| D5 | 10101 |
| D6 | 10110 |
| D7 | 10111 |
| P0 | 00001 |
| P1 | 00010 |
| P2 | 00100 |
| P3 | 01000 |
| P4 | 10000 |

12-Bit Parity Equations

The following are the 12 parity equations preferably required for an ECC word of 1024 bits (ECC word of all 1s should result in parity bits of all 1s):

P0=! XOR(D1, D3, D5, . . . , D1023)
P1=! XOR(D2-D3, D6-D7, . . . , D1022-D1023)
P2=! XOR(D4-D7, D12-D15, . . . , D1020-D1023)
P3=! XOR(D8-D15, D24-31, . . . , D1016-D1023)
P4=! XOR(D16-D31, D48-D63, . . . , D1008-D1023)
P5=! XOR(D32-D63, D96-127, . . . , D992-D1023)
P6=! XOR(D64-D127, D192-D255, . . . , D960-D1023)
P7=! XOR(D128-D255, D384-D511, . . . , D896-D1023)
P8=! XOR(D256-D511, D768-D1023)
P9=! XOR(D512-D1023)
P10=! XOR(D0-D511)
P11=! XOR(D0-D1023)

Smart ECC Updates

Smart ECC preferably updates allow the parity bits to be written twice per ECC word. This feature allows partial page writes to be covered by ECC. The first set of the parity bits is written during the first write of new data to the ECC word. Any subsequent write with new data preferably will invalidate the first set of parity bits. The second set of parity bits is written when the page is being "closed." A page is considered "closed" when any bits in the last octbyte of the ECC word are programmed. This model works well with the FAT structures that require partial page writes.

The Smart ECC flags and parity bits are preferably only updated when the new parity bits do not match existing valid parity bits. Rewrites of the same data (which will result in matching parity bits) will not change the state of the Smart ECC flags.

| Unwritten Word: ECC enabled on reads | | | | | |
|---|---|---|---|---|---|
| 111111111111 | 11 | 11 | 111111111111 | 11 | 11 |
| Parity0[11:0] | Unused0[1:0] | Valid0[1:0] | Parity1[11:0] | Unused1[1:0] | Valid1[1:0] |

The above shows the ECC parity, unused, and valid bits for a word of data that has not yet been programmed. The valid and unused bits are each replicated two times for redundancy. In this state, since Parity0 is valid, ECC is enabled on reads. Note that it does not matter what value Unused0 is if Valid0 is 1. (This is not true for the Parity1 bits.)

The number of parity, unused, and valid bits above is 32 bits, or 4B. With four 128B ECC words per page, there are 16B of ECC parity, unused, and valid bits per page.

| Parity0 Written: ECC enabled on reads | | | | | |
|---|---|---|---|---|---|
| 100101101110 | 00 | 11 | 111111111111 | 11 | 11 |
| Parity0[11:0] | Unused0[1:0] | Valid0[1:0] | Parity1[11:0] | Unused1[1:0] | Valid1[1:0] |

The above shows the ECC parity, unused, and valid bits for a word of data that has been programmed once. Since Unused0 was previously at 1, we knew that Parity0 could be programmed to reflect the data being written. Unused0 was also programmed to 0 to indicate that Parity0 has been written. In this state, since Parity0 is still valid, ECC is enabled during reads.

| Parity0 Invalidated: ECC disabled on reads | | | | | |
|---|---|---|---|---|---|
| 100101101110 | 00 | 00 | 111111111111 | 11 | 11 |
| Parity0[11:0] | Unused0[1:0] | Valid0[1:0] | Parity1[11:0] | Unused1[1:0] | Valid1[1:0] |

The above shows the ECC parity, unused, and valid bits for a word of data that has its Parity0 bits invalidated by programming Valid0 to 0. After the first write to the word of data, a subsequent write will invalidate the Parity0 bits if Used0 has already been programmed to 0. In this state, since Parity0 has been invalidated and Parity1 has yet to be updated, ECC is disabled on reads.

| Parity1 Updated: ECC enabled on reads | | | | | |
|---|---|---|---|---|---|
| 100101101110 | 00 | 00 | 100101101110 | 00 | 11 |
| Parity0[11:0] | Unused0[1:0] | Valid0[1:0] | Parity1[11:0] | Unused1[1:0] | Valid1[1:0] |

The above shows the ECC parity, unused, and valid bits for a word of data that has its Parity1 bits written. This happens when any bits in the last octbyte of the word are programmed and Unused1 was previously at 1. Unused1 is also programmed to 0 to indicate that Parity1 has been written. In most cases, when the last octbyte is being programmed, this is the last partial page write to the word of data. In this state, since Parity1 is valid and written, ECC is enabled on reads. (Unlike the Parity0 bits, the Unused1 flag must be at 0 for the parity bits to be valid.)

| Parity1 Invalidated: ECC disabled on reads | | | | | |
|---|---|---|---|---|---|
| 100101101110 | 00 | 00 | 100101101110 | 00 | 00 |
| Parity0[11:0] | Unused0[1:0] | Valid0[1:0] | Parity1[11:0] | Unused1[1:0] | Valid1[1:0] |

The above shows the ECC parity, unused, and valid bits for a word of data that has its Parity1 bits invalidated by programming Valid1 to 0. After the Parity1 bits are written, if there is a subsequent write to this word of data, the Parity1 bits must be invalidated. In this state, since neither Parity0 nor Parity1 are valid, ECC is disabled on reads.

Decoding Redundant Unused and Valid Flags

The Unused[1:0] and Valid[1:0] flags are used to encode three different states for the parity bits. The following table lists these states.

| {Unused[1:0], Valid[1:0]} | PARITY STATE |
|---|---|
| 1111 | UNWRITTEN |
| 0011 | WRITTEN AND VALID |
| 0000 | INVALIDATED |

However, since we only have two redundant bits per flag, if there is a bit error in one of the redundant bits, it is difficult to determine which one of the redundant bits is wrong. Because of this, we will always use both the Unused[1:0] and Valid[1:0] bits to determine the parity state. The following table shows that this decoding is done by counting the total number of 0s in those bits.

| Number of 0s | PARITY STATE | {Unused[1:0], Valid[1:0]} |
|---|---|---|
| 0 | UNWRITTEN | 1111 only |
| 1 | UNWRITTEN | 0111, 1011, 1101, 1110 |

-continued

| Number of 0s | PARITY STATE | {Unused[1:0], Valid[1:0]} |
|---|---|---|
| 2 | WRITTEN AND VALID | 0011, 0101, 0110, 1001, 1010, 1100 |
| 3 | INVALIDATED | 1000, 0100, 0010, 0001 |
| 4 | INVALIDATED | 0000 only |

Using two instead of four redundant bits per flag decreases the number of bits used up in memory at the expense of reduced robustness of the redundancy.

Special Case-Page 0

When TF_SECC_PAGE0 TB='1', page 0 of memory will be treated slightly differently. Normally, the Parity1 bits can be written only when any bits in the last octbyte of the word are programmed. In this special case, this restriction is lifted. Thus, once the Parity0 bits are used, the next write will always result in the Parity1 bits being used.

Trim Fuse Bits

There are 3 trim fuse bits that affect the ECC logic:
TF_ECC_DISABLE_TB

When TF_ECC_DISABLE_TB='1', the ECC logic is disabled and the host has full read and write access to bytes 512-527 in the sideband of each page.

When TF_ECC_DISABLE_TB='0', the ECC logic is enabled and bytes 512-527 in the sideband of each page are used to store various ECC bits used to implement LBECC and Smart ECC updates. Any host writes to the sideband area will be discarded. Any host reads from the sideband area will return undefined data.
TF_SMARTECC_DISABLE_TB When TF_SMARTECC_DISABLE_TB='1', the Smart ECC update logic is disabled. When TF_SMARTECC_DISABLE_TB='0', the Smart ECC update logic is enabled. (TF_ECC_DISABLE_TB must also be set to '0'.)
TF_SECC_PAGE0_TB

When TF_SECC_PAGE0_TB='0', all pages use the same Smart ECC logic. When TF_SECC_PAGE0_TB='1', page 0 is treated differently than all the other pages with respect to the Smart ECC update logic.

Memory Map

All ECC parity, unused, and valid bits live in bytes 512-527 in the sideband of each page. The following shows how the bits for all four ECC words are arranged.

| 527 | 524 | 523 | 520 | 519 | 516 | 515 | 512 |
|---|---|---|---|---|---|---|---|
| Word 3 | | Word 2 | | Word 1 | | Word 0 | |

The following shows how the bits are arranged for one ECC word (example is for Word 0).

Parity1 [11:0]  Unused1 [1:0]   Valid1 [1:0]   Parity0 [11:0]   Unused0 [1:0]   Valid0 [1:0]

Testing

Testing of the ECC logic can be done using DAM mode. When DAM mode is enabled for either write or read transactions, no data will be transferred between the page register and the memory array. The TF_ECC_DISABLE_TB bit must be deasserted for the ECC logic to be tested. The following describes this testing in more detail.

ECC Correction
1. Enable DAM mode. Enable ECC.
2. Issue DATAIN command with 512 bytes of write data and 16 bytes of ECC data.
3. Issue READ command. (Chip will go busy as ECC scrubbing is done before data can be read back.)
4. Verify that 512 bytes of data are as expected. (If single bit error was written into PR, verify that the error was corrected.)

ECC Generation
1. Enable DAM mode. Enable ECC.
2. Issue DATAIN command with 512 bytes of write data.
3. Issue PROG command. (This causes the 16 generated bytes of ECC to be written into PR.)
4. Issue READ command. (Previous 512 bytes of write data will be read back, along with generated 16 bytes of ECC data.)
5. Verify 16 ECC bytes are correctly generated.

As described above, one approach to using ECC uses 8B (octbyte) ECC words, wherein the ECC syndrome is 1B wide. This creates a 12.5% overhead and contributes ~9-10% of the total die size, in one implementation. This approach uses a single bit-correct/double bit-detect algorithm, which processes 72 bits of data in parallel. In contrast, large block ECC uses an ECC word that is large enough to reduce the overhead of syndrome storage. As noted above, it is presently preferred to use a single-bit-detect-only algorithm to further reduce overhead. This algorithm processes data sequentially.

There are various options for ECC syndrome storage. In one option (option 1), ECC syndrome bits are stored in the extended page area. One presently preferred architecture allocates 18B (16B of data and 2B ECC syndrome bits) to the extended page. With this option, a trimfuse or a pin can be used to (1) use internal ECC generation with syndrome stored in the extended page space and users cannot access the extended page space and (2) bypass internal ECC generation to allow users to access the extended page space and to use their own ECC algorithm. In another option (option 2), ECC syndrome bits are stored in a dedicated space. Depending on the block size, this could be using some of the CR space.

The minimum quantity that can be written during partial page writes is equal to the ECC word size and is currently set to 8B in a presently preferred embodiment. There are several options. In option 1, the memory device recognizes a partial page write and disables ECC for that page. There are no backward compatibility issues for this option, however, data integrity after partial writes will be compromised. Option 2 is the same as option 1 plus adding re-write ECC capability for N times. The memory device will be intelligent enough to recognize a partial write, invalidate the old ECC syndrome, and write the new syndrome to a new location. With a large block size of 128B and above, this would be able to provide enough storage capability for 2-3 rewrites per block. It is an improvement over the previous solution at extra complexity. Option 3 provides a smart ECC syndrome update. During the first write into the ECC word, the syndrome will be written. A second write into the ECC word will invalidate the syndrome and data will loose its ECC protection. Following subsequent appends to the ECC word, once it is fully written, a new (and ultimate) syndrome is created and data will be protected forever on. This reduces the DPM exposure dramatically because the only unprotected areas will be those few dynamic areas that are not entirely filled the ECC word. Option 4 is the same as option 2 with the addition of redundant row repair capability. After the N re-writes in option 2, the N+1$^{st}$ rewrite triggers a row repair, and the rewrite count resets.

In another alternative, a data scrubbing after read technique is provided. With this technique, if forward stress during reads is a major contributor to disturb, then one can check the status of the ECC correction logic and identify a bad bit as soon as it turns bad. Then, one can use the existing CR scheme to repair it. Unless two bits turn bad simultaneously, this scheme will be a very effective way of going after read disturb.

What is claimed is:
1. A memory device comprising:
a memory array storing a file system structure; and
a controller in communication with the memory array, wherein the controller is operative to generate an error in response to an attempt to write data to an address above an address of the file system structure;
wherein the attempt to write data to the address above the address of the file system structure is made in response to a command to format the memory device.
2. The memory device of claim 1, wherein the file system structure comprises a file allocation table.
3. The memory device of claim 1, wherein the memory array comprises a one-time programmable memory array.
4. The memory device of claim 1, wherein the memory array comprises a few-time programmable memory array.
5. The memory device of claim 1, wherein the memory array comprises a three-dimensional memory array.

* * * * *